United States Patent
Qiao et al.

(10) Patent No.: US 9,834,675 B2
(45) Date of Patent: Dec. 5, 2017

(54) RESIN COMPOSITION HAVING IMPROVED HAZE AND LIGHT TRANSMITTANCE AND PROCESS FOR PREPARING THE SAME

(71) Applicants: China Petroleum & Chemical Corporation, Beijing (CN); Beijing Research Institute of Chemical Industry, China Petroleum & Chemical Corporation, Beijing (CN)

(72) Inventors: Jinliang Qiao, Beijing (CN); Yue Ru, Beijing (CN); Xiaohong Zhang, Beijing (CN); Wantai Yang, Beijing (CN); Guicun Qi, Beijing (CN); Chuanlun Cai, Beijing (CN); Jinmei Lai, Beijing (CN); Binghai Li, Beijing (CN); Xiang Wang, Beijing (CN); Zhihai Song, Beijing (CN); Jianming Gao, Beijing (CN); Hongbin Zhang, Beijing (CN); Haibin Jiang, Beijing (CN); Gu He, Beijing (CN)

(73) Assignees: CHINA PETROLEUM & CHEMICAL CORPORATION, Beijing (CN); BEIJING RESEARCH INSTITUTE OF CHEMICAL INDUSTRY, CHINA PETROLEUM & CHEMICAL CORPORATION, Beijing (CN)

( * ) Notice: Subject to any disclaimer, the term of this patent is extended or adjusted under 35 U.S.C. 154(b) by 0 days.

(21) Appl. No.: 15/094,501

(22) Filed: Apr. 8, 2016

(65) Prior Publication Data
US 2016/0297965 A1    Oct. 13, 2016

(30) Foreign Application Priority Data

Apr. 10, 2015 (CN) .......................... 2015 1 0169157

(51) Int. Cl.
*C08L 69/00* (2006.01)
*C08K 7/16* (2006.01)

(52) U.S. Cl.
CPC ................ *C08L 69/00* (2013.01); *C08K 7/16* (2013.01); *C08L 2205/03* (2013.01); *C08L 2205/18* (2013.01)

(58) Field of Classification Search
CPC ............................ C08L 69/00; C08L 2205/18
See application file for complete search history.

(56) References Cited

U.S. PATENT DOCUMENTS

2009/0093583 A1* 4/2009 Kawato ............... G02B 5/0278
524/502
2013/0090411 A1 4/2013 Aratani et al.

FOREIGN PATENT DOCUMENTS

| CN | 101235117 | 8/2008 |
|----|-----------|--------|
| CN | 101880450 | 11/2010 |
| WO | 2005025938 A1 | 3/2005 |

OTHER PUBLICATIONS

Odian (Principles of Polymerization, 2nd Ed., Wiley-Interscience, (1981) pp. 423-435).*
Seymour et al. Polymer, 17 (1976) 21-24.*
Extended European search report for European patent application No. 16164648.4.

* cited by examiner

Primary Examiner — Kuo-Liang Peng
(74) Attorney, Agent, or Firm — Duane Morris LLP

(57) ABSTRACT

The present invention relates to a resin composition having an improved haze effect and light transmittance and a process for preparing the same. The resin composition comprises blended components: a) a matrix resin; and b) crosslinked copolymer microspheres; wherein the crosslinked copolymer microspheres are alternating copolymers formed from monomers having anhydride, amide and/or imide groups, with olefin monomers and/or furan and its derivatives and optionally crosslinked with a crosslinking agent; preferably, the resin composition has a haze of not less than 92%, and a light transmittance of not less than 55%, preferably a haze of not less than 92%, and a light transmittance of not less than 59%, and more preferably a haze of not less than 95%, and a light transmittance of not less than 59%. The resin composition is energy efficient in use, provides excellent light diffusing effect, and, at the same time reduces the material cost.

67 Claims, No Drawings

RESIN COMPOSITION HAVING IMPROVED HAZE AND LIGHT TRANSMITTANCE AND PROCESS FOR PREPARING THE SAME

CROSS-REFERENCE TO RELATED APPLICATION

The present application claims priority to Chinese patent application No. 201510169157.1, filed on Apr. 10, 2015, the teaching of which is incorporated herein in its entirety by reference.

TECHNICAL FIELD

The present invention relates to the technical field of polymer materials, and further, to a resin composition, especially polycarbonate resin composition, having improved haze and light transmittance, and the process for preparing the same, as well as the material prepared from the resin composition, and the modifier for improving haze and light transmittance used therein.

BACKGROUND ART

Due to social energy shortage at present, the whole society is promoting energy saving and environmental protection. In the aspect of lighting, in order to reduce energy consumption, China has enacted "Notice on the Progressive Ban and Sale of Ordinary Lighting Incandescent Lamp" in the year 2011, which provides that the import and sale of ordinary lighting incandescent lamp of 100 watts and above is prohibited nationwide. Therefore, energy-saving lighting lamp will gradually replace ordinary incandescent lamp in the future.

Due to the very high energy conversion rate, low power consumption, long service life, absence of heavy metals and other characteristics, use of LED lamps as energy-saving light source has become a development trend, and LED lamps have gradually replaced the original ordinary energy-saving lamps. Nevertheless, LED lamps have too high light intensity per unit area, and thus dizziness, visual discomfort and other symptoms will occur after direct view. Meanwhile, when LED and LCD are used as display materials, similar problems have also been encountered.

Therefore, when such lamps with bright light are used as a light source or backlight, addition of a material outside is required. When light passes through this material, due to the diffusing effect of the material, point light source can be converted into surface light source, so that the light is softened. This material is called as light diffusing material.

Light diffusing material is mainly used in illumination, including lamps and luminous signs, especially translucent signs of backlight, car skylight, automobile lampshade and so on. In addition, it also has great application value in the aspect of building materials. Roof or greenhouse made of translucent polycarbonate resin can prevent adverse effects caused by direct light, and the plastics far exceeds light diffusing glass in processing performance, and is easily processed and transported. This material can also be used in the display or projection device as scratch-resistant rear projection screen or thin-layer decorative plate.

Polycarbonate resin is a very widely used engineering plastic, and exhibits high light transmittance, but low haze. Some polymethyl methacrylate microspheres, acrylate microspheres or glass beads and other aids are commonly used to increase the haze of the material. However, since the two materials differ in refractive index, light is involved in refraction and absorption on the surface of these particles multiple times. Although the haze of the material is greatly increased, and damage to human eye caused by strong light is reduced, transmittance of light diffusing material is also significantly reduced at the same time, and ultimately only a small part of the energy is converted into light energy, resulting in huge energy consumption.

Chinese patent application CN 101880450 A discloses a process for preparing polycarbonate resin having both high haze and high light transmittance, which process requires addition of polymethyl methacrylate microbeads to polycarbonate to increase haze of the material, wherein a light transmittance of 80% but simultaneously a haze of less than 30% is achieved.

Chinese patent application CN 102250462 A discloses a process for the preparation of light diffusing material using polycarbonate to thereby prepare LED lampshade, in which silicon resin and other light diffusing agent are added to polycarbonate, so that the haze of the material reaches above 90%, but light transmission is only 40%. It cannot be directly used as a light diffusing material.

Therefore, how to prepare a material having improved haze and light transmittance becomes an urgent problem.

DISCLOSURE

The object of the present invention is to provide a resin composition, especially polycarbonate resin composition, having improved haze and light transmittance, preferably the resin composition has both high haze and high light transmittance.

Another object of the present invention is to provide a process for preparing such resin composition. This process uses a common rubber plastics blending equipment, and blends all the components for preparing the resin composition one time to prepare a resin composition having improved haze and light transmittance. Such process can be simply carried out.

According to the present invention, the objects are achieved by a resin composition having improved haze and light transmittance, comprising the following blended components: a. matrix resin; and b. crosslinked copolymer microspheres; wherein the crosslinked copolymer microspheres are alternating copolymers formed from monomers having anhydride, amide and/or imide groups, with olefin monomers and/or furan and its derivatives and optionally crosslinked with a crosslinking agent.

The matrix resin as the component a according to the present invention can be selected from at least one transparent or translucent matrix resin, preferably at least one of polycarbonate resins, acrylic resins, polyester resins, cyclic olefin polymer resins, polystyrene resins, poly(ethylene-co-1,4-cyclohexylenedimethylene terephthalate) (PETG), acrylonitrile-butadiene-styrene copolymer (ABS), acrylonitrile-styrene resin (AS), methylmethacrylate-butadiene-styrene copolymer (MBS), polypropylene, polyethylene, nylon, ethylene-vinyl acetate copolymer (EVA), allyl diglycol carbonate (CR-39), poly-4-methyl-1-pentene (TPX), poly(hydroxyethyl methacrylate) (HEMA), polyvinyl alcohol, cellulose acetate, cellulose nitrate, ethylene-tetrafluoroethylene copolymer, polyvinyl butyral, polyether sulphone and derivatives thereof; more preferably polycarbonate resins, especially aromatic polycarbonate resins.

The resin composition can optionally further comprises the following blended component: c. silicone resin microspheres.

The resin composition, especially polycarbonate resin composition of the present invention has the following microscopic morphology: the matrix resin as component a is continuous phase, crosslinked copolymer microspheres as component b and optional silicone resin microspheres as component c are dispersed phase, and are homogenously dispersed in the matrix resin as continuous phase, and wherein the anhydride and the like group on the surface of crosslinked copolymer microspheres of the component b can react with the matrix resin of the continuous phase, and a transition layer between the surface thereof and the matrix resin is thus formed, which contributes to the dispersion thereof in the matrix resin. Additionally, since the two kinds of microspheres of the component b and optional the component c in the dispersed phase and the matrix resin as the continuous phase have different refractive indexes, when light passes through the composition, under the action of microspheres, especially the combined action of the two kinds of microspheres, in the dispersed phase, the original light source can be dispersed very effectively, the point light source is converted into surface light source, so that the haze of the matrix resin composition is greatly increased, and meanwhile said resin composition can have a relatively high light transmittance.

The resin composition, especially the polycarbonate resin composition of the present invention has a haze of not less than 92%, preferably a haze of not less than 95%; preferably, simultaneously has a light transmittance of not less than 55%, preferably a light transmittance of not less than 59%. Especially, the resin composition has a haze of not less than 92%, and a light transmittance of not less than 55%; preferably a haze of not less than 92%, and a light transmittance of not less than 59%; more preferably a haze of not less than 95%, and a light transmittance of not less than 59%.

The composition in actual use can effectively reduce the energy loss, and achieve the purpose of saving a lot of energy.

Polycarbonate resin preferably as the component a in the resin composition of the present invention can be selected from various polycarbonate resins as known in the art, preferably an aromatic polycarbonate, more preferably a copolycarbonate formed from dihydric phenol and/or phenol-modified diol. It can be prepared by conventional process, preferably by interfacial polymerization process, i.e. a process of reacting a dihydric phenol, phenol-modified diol with phosgene and other carbonate precursors during the polymerization process. The dihydric phenol may be the compound of following formula (I):

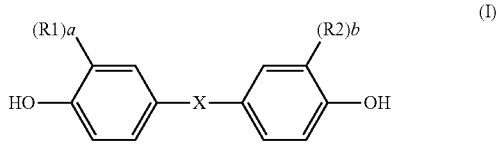

in which,

R1 and R2 each independently represent an alkyl group having 1-6 carbon atoms, which may be linear, branched or cyclic and may be selected from: methyl, ethyl, n-propyl, isopropyl, n-butyl, isobutyl, tert-butyl, n-pentyl, isopentyl, n-hexyl, isohexyl, cyclopentyl, cyclohexyl and the like;

a and b respectively represent the number of substituents R1 and R2, and are an integer of 0 to 4; when R1 is two or more, the multiple R1s are the same or different from each other; when R2 is two or more, the multiple R2s are the same or different from each other;

X is a single bond, an alkylene having 1 to 8 carbon atoms (such as methylene, ethylene, propylene, butylene, pentylene, hexylene, etc.), an alkylidene group having 2 to 8 carbon atoms (such as ethylidene, isopropylidene, etc.), a cycloalkylene having 5 to 15 carbon atoms (such as cyclopentylene, cyclohexylene, etc.), a cycloalkylidene having 5 to 15 carbon atoms (such as cyclopentylidene, cyclohexylidene, etc.), —S—, —SO—, —O—, —CO— or the structure shown by the following formula (II-a) or formula (II-b):

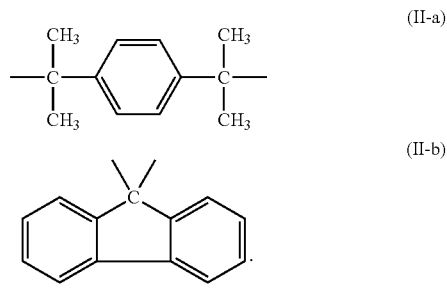

The above dihydric phenol of formula (I) can be various dihydric phenols for preparation of polycarbonate, is preferably at least one of bis(hydroxy aryl) alkanes such as 2,2-bis(4-hydroxyphenyl)propane [known as bisphenol A], bis(4-carboxy phenyl)methane, 1,1-bis(4-hydroxyphenyl)ethane, 2,2-bis(4-hydroxyphenyl)propane, 2,2-bis(4-hydroxyphenyl)butane, 2,2-bis(4-hydroxyphenyl)octane, 2,2-bis(4-hydroxyphenyl) phenylmethane, 2,2-bis(4-hydroxy-1-methylphenyl) propane, bis(4-hydroxyphenyl) naphthylmethane, 1,1-bis(4-hydroxy-tert-butylphenyl)propane, 2,2-bis(4-hydroxy-3-bromophenyl)propane, 2,2-bis(4-hydroxy-3,5-dimethylphenyl)propane, 2,2-bis(4-hydroxy-3-chlorophenyl)propane, 2,2-bis(4-hydroxy-3,5-dichlorophenyl)propane, 2,2-bis(4-hydroxy-3,5-dibromophenyl)propane; bis(hydroxylaryl)cycloalkanes such as 1,1-bis(4-hydroxyphenyl)cyclopentane, 1,1-bis(4-hydroxyphenyl) cyclohexane, 1,1-bis(4-hydroxyphenyl)-3,5,5-trimethyl cyclohexane; dihydroxy aromatic ethers such as 4,4'-dihydroxyphenyl ether, 4,4'-dihydroxy-3,3-dimethylphenyl ether; dihydroxydiaryl sulfides such as 4,4'-dihydroxy diphenyl sulfide, 4,4'-dihydroxy-3,3'-dimethyldiphenyl sulfide; dihydroxy diaryl sulfoxides such as 4,4'-dihydroxydiphenyl sulfoxide, 4,4'-dihydroxy-3,3'-dimethyl diphenyl sulfoxide; dihydroxydiarylsulfones such as 4,4'-dihydroxydiphenyl sulfone, 4,4'-dihydroxy-3,3'-dimethyl diphenyl sulfone; dihydroxybiphenyls such as 4,4'-dihydroxy-biphenyl; dihydroxydiphenyl fluorenes such as 9,9-bis(4-hydroxyphenyl) fluorene, 9,9-bis(4-hydroxy-3-methylphenyl)fluorene; dihydroxydiaryl adamantanes such as 1,3-bis(4-hydroxyphenyl)adamantane, 2,2-bis(4-hydroxyphenyl) adamantane, 1,3-bis(4-hydroxyphenyl)-5,7-dimethyl adamantane; bis(4-hydroxyphenyl)diphenylmethane, 4,4'-[1,3-phenylene bis(1-methylethylidene)]bisphenol, 10,10-bis(4-hydroxyphenyl)-9-anthrone, 1,5-bis(4-hydroxyphenylthio)-2,3-dioxa-pentene, α,ω-bishydroxyphenyl polydimethylsiloxane compound, and more preferably 2,2-bis(4-hydroxyphenyl) propane, i.e., bisphenol A.

The phenol-modified diol used in present invention can be a compound represented by the following formula (III):

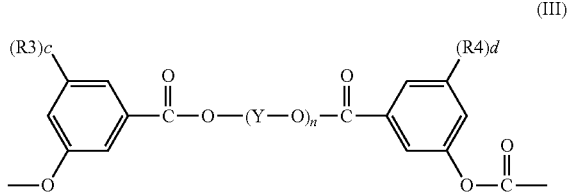
(III)

in which
R3 and R4 each independently represent an alkyl group having 1 to 3 carbon atoms,
Y represents a linear or branched chain alkylene having 2 to 15 carbon atoms,
c and d represent the number of substituents R3 and R4, and are an integer from 0 to 4,
n is an integer of 2 to 200, preferably an integer of 6 to 70;
the alkyl of R3 and R4 may be selected from methyl, ethyl n-propyl and isopropyl; when R3 is two or more, the multiple R3s are the same or different from each other; when R4 is two or more, the multiple R4s are the same or different from each other;
the linear or branched chain alkylene having 2 to 15 carbon atoms represented by Y may include: alkylene such as ethylene, propylene, butylene, isobutylene, pentylene and isopentylene.

Phenol-modified diol is a compound derived from hydroxybenzoic acid or its alkyl ester, acyl chloride and polyether-type diol. Hydroxybenzoic acid alkyl ester is preferably methyl hydroxybenzoate, and ethyl hydroxybenzoate, acyl chloride is preferably a compound obtained by reacting hydroxybenzoic acid with phosgene, polyether-type diol is preferably a compound having the formula HO—(Y—O)$_n$—H (Y and n are as defined in formula III), and is preferably polyethylene glycol, polypropylene glycol, and polybutylene glycol, and more preferably polybutylene glycol.

The crosslinked copolymer microspheres as component b in the resin composition of the present invention are alternating copolymers formed from monomers having anhydride, amide and/or imide groups, with olefin monomers and/or furan and its derivatives, and optionally crosslinked with a crosslinking agent. Preferably, the crosslinked copolymer microspheres are monodisperse copolymer microspheres. The crosslinked copolymer microspheres may have a particle size of from 0.01 to 20 microns, preferably from 0.1 to 10 microns, and more preferably from 0.3 to 5 microns.

Preferably, the crosslinked copolymer microspheres are prepared by a self-stabilized dispersion polymerization process, for example, they can be prepared by the process as disclosed in the Chinese patent CN100579995C and the Chinese patent CN101781387B.

Specifically, as for mono-olefins as olefin monomers, for example, under the protection of nitrogen, the monomers and initiator and optionally the crosslinking agent are added to the medium to dissolve them, and react at 60 to 90° C. for 0.25 to 12 h, to give a dispersion system of alternating copolymer microspheres, and then isolated by centrifugation to yield white solid of the alternating copolymer; wherein the mass concentration of monomers in the reaction system is 1% to 50%, the initiator is an organic peroxide or an azo compound, the mass concentration of the initiator in the reaction system is from 0.01% to 1%; the medium is an organic acid alkyl ester, a mixed solution of an aromatic hydrocarbon and an organic acid alkyl ester, or a mixed solution of a ketone with an alkane, wherein the volume fraction of the ketone in the mixed solution of a ketone with an alkane is 5% to 65%.

As for conjugated dienes as olefin monomers, for example, under the protection of nitrogen, the monomer having anhydride, amide and/or imide groups and the initiator and optionally the crosslinking agent are added to the medium to sufficiently dissolve them, and then conjugated diene or its mixture with optional crosslinking agent is added to the system to dissolve it, and they react at 50 to 90° C. for 0.5 to 73 h, to give a dispersion system of copolymer microspheres, and then isolated by centrifugation and dried in vacuum to yield white solid of the copolymer; wherein the initiator is an organic peroxide or an azo compound, the mass concentration of the initiator in the reaction system is from 0.01% to 1%; the medium is an organic acid alkyl ester, an aromatic hydrocarbon or a mixed solution of an organic acid alkyl ester and an alkane, wherein the volume fraction of the alkane in the mixed solution of an organic acid alkyl ester and an alkane is 25% to 75%.

The content of the crosslinked copolymer microspheres as component b may be 0.01 to 10 parts, preferably 0.05 to 8 parts, and more preferably 0.1 to 5 parts, further preferably, 0.1 to 3 parts, based on 100 parts by weight of the matrix resin as component a.

The monomer having anhydride, and/or imide group in the crosslinked copolymer microspheres are preferably compound having the following formula (IV):

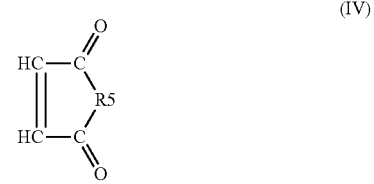
(IV)

wherein R5 may represent oxygen atom, imino group or derivative thereof, preferably oxygen atom, imino group, phenylimino, alkylphenylimino or alkylimino having 1 to 20 carbon atoms, wherein the alkyl group may be linear, branched or cyclic; more preferably oxygen atom or imino group.

The monomers having anhydride, and/or imide group may specifically be selected from at least one of maleic anhydride, maleimide, bismaleimide, and phenyl maleimide.

The olefin monomer in the crosslinked copolymer microspheres may be selected from one or more of the olefin monomers containing from 2 to 30 carbon atoms, more preferably one or more of butene (e.g., isobutene), butadiene (e.g., cis-butadiene), pentene, isoprene, cyclopentadiene, dicyclopentadiene, hexene, hexadiene, cyclohexene, cyclohexadiene, octene, octadiene, cyclooctadiene, styrene and derivatives thereof (e.g., hyperbranched styrene, sulfonated styrene, alpha-methylstyrene), and vinyl alkyl ether.

The furan or its derivatives in the crosslinked copolymer microspheres is preferably selected from furan, furfural and its derivatives, 2,3-dihydrogenfuran and its derivatives, 2-methylfuran and its derivatives, 2-furoic acid and its derivatives, 2-furamide and its derivatives, furyl alcohol and its derivatives.

The crosslinked copolymer microspheres may optionally comprise a monomer having acid, ester, ether, and/or nitrile group, which may be selected from one or more of vinyl acetate, acrylonitrile, vinyl alkyl ethers, etc.

The process for preparing crosslinked copolymer microspheres may use a crosslinking agent. The crosslinking agent used may be olefinic organic compounds with polyfunctionality, such as aliphatic divinyl esters, such as ethylene glycol dimethacrylate (EGDMA), ethylene glycol diacrylate, trimethylolpropane trimethacrylate (TMPTMA) and the like, aromatic divinyl benzene and the like; preferably ethylene glycol dimethacrylate (EGDMA), and trimethylolpropane trimethacrylate (TMPTMA).

The content (molar ratio) of the monomer having anhydride, amide and/or imide group contained in the crosslinked copolymer microspheres may be 10 to 90%, preferably 20 to 80%, and more preferably 30 to 50%; the content (molar ratio) of the other one or more monomers (olefin monomer and/or furan and its derivatives and/or monomer having acid, ester, ether and/or nitrile group) may be 10 to 90%, preferably 20 to 80%, and more preferably 30 to 50%; and the content (molar ratio) of the crosslinking agent may be 0 to 50%, preferably 0 to 40%, and more preferably 0 to 30%.

The crosslinked copolymer microspheres have dispersion coefficient (U) of the particle size of 1.05 to 1.0001, preferably 1.02 to 1.001, more preferably 1.017 to 1.001. The dispersion coefficient of the particle size is determined by sampling from the dispersion system of the polymer and observing the morphology of the polymer microspheres using scanning electron microscopy. The size of microspheres is represented by average particle diameter ($D_n$), and the particle size distribution is represented by the dispersion coefficient. The formulae are as follows:

$$D_n = \sum_{i=1}^{k} D_i \bigg/ \sum_{i=1}^{k} i \quad (1)$$

$$D_w = \sum_{i=1}^{k} D_i^4 \bigg/ \sum_{i=1}^{k} D_i^3 \quad (2)$$

$$U = D_n / D_w \quad (3)$$

wherein
$D_i$ is the diameter of particle $i$ (nm);
$n$ is capacity of sample;
$D_w$ is the defined mathematically average diameter.

The above crosslinked copolymer microspheres as component b may have a particle size of from 0.01 to 20 microns, preferably from 0.1 to 10 microns, more preferably from 0.3 to 5 microns. The particle size can be controlled by reaction process parameters such as reaction time, monomer concentration, and reaction medium.

The silicone resin in silicone resin microspheres as optional component c in the resin composition of the present invention can be selected from various silicone resins as known in the art, preferably organopolysiloxane, and more preferably it contains at least one phosphonate group and/or phosphinate group and at least one nitrogen-containing organic group, it contains at least one phosphonate or phosphinate moiety present in $RPR_2SiO_{1/2}$ units and/or $RPRSiO_{2/2}$ units and/or $RPSiO_{3/2}$ units, wherein the group P is alkyl group, cycloalkyl group, alkenyl group, alkynyl group or aryl group having 1-30 carbon atoms and containing phosphonate or phosphinate substituent, and each group R is alkyl group, cycloalkyl group, alkenyl group, alkynyl group or aryl group having 1 to 30 carbon atoms.

The above silicone resin microspheres as component c may have a particle size of from 0.1 to 100 microns, preferably from 1 to 50 microns, more preferably from 2 to 30 microns, and further preferably from 2 to 12 microns.

The content of the silicone resin microspheres as component c is 0.01 to 10 parts, preferably 0.05 to 8 parts, and more preferably 0.1 to 5 parts, more preferably 0.1 to 2 parts, based on 100 parts by weight of the matrix resin as component a.

The resin composition of the present invention can also comprise at least one additive commonly used in plastic processing. Their amount may be conventional amount, or adjusted according to the actual requirements.

The process for preparation of resin composition of the present invention comprises the step of: one-time melt blending all the components including the matrix resin as component a, crosslinked copolymer microspheres as component b and optional silicone resin microspheres as component c etc., via common rubber plastic blend equipment, by using common melt blending process in rubber plastic processing.

During the preparation, the blending temperature of the mass corresponds to common processing temperature of the matrix resin, and should be selected within the range of ensuring the completely melting of the matrix resin while not decomposing it. In addition, according to the processing needs, conventional additives in plastic processing can be added to the blended mass in suitable amount. During the blending, the various components including the matrix resin, crosslinked copolymer microspheres and optional silicone resin microsphere can be simultaneously added to the melt blending equipment via metering and other means for melt blending; alternatively, the various components can be mixed homogenously beforehand with common mixing equipment, and then via rubber plastic blending equipment, one-time melt blending and extrusion is performed to obtain the resin composition.

The rubber plastic blending equipment used in the preparation process of the present invention may be open mill, internal mixer, single-screw extruder, twin-screw extruder or torque rheometer, etc. The mass mixing equipment is selected from high-speed stirrer, kneader, and other mechanical mixing equipment commonly used in the art.

The resin composition of the present invention is obtained by the process of one-time melt blending all the components including matrix resin, crosslinked copolymer microspheres and optional silicone resin microspheres. In the thus obtained composition, crosslinked copolymer microspheres and optional silicone resin microspheres are homogenously distributed in matrix resin as the continuous phase; when both the two kinds of microspheres are contained, both the two kinds of microspheres are in monodisperse state, wherein the crosslinked copolymer microspheres have anhydride group and the like group on the crosslinked surface, thus can be involved in transesterification with the carbonyl group and the like structure on the molecular chain of the matrix resin, especially polycarbonate resin, which further contributes to the dispersion in the matrix resin. When light passes through the composition, incident light can be dispersed under the action of microspheres, the combined action of the two kinds of microspheres, in the dispersed phase, so that the point light source is converted into surface light source, and thereby the haze of the resin composition is greatly increased, meanwhile the resin composition can have relatively high light transmittance. As a result, a lot of energy can be saved. Meanwhile, the amount of the material used is reduced, and the cost of material is significantly reduced.

The present invention further provides a material with improved haze and light transmittance prepared from the resin composition according to the present invention. The material is preferably a light diffusing material. The material can be used in illumination, such as lamps, luminous signs, car skylight, and automobile lampshade; building materials, such as roof or greenhouse; in displays or projection devices as scratch-resistant rear projection screen or thin-layer decorative plate; in light diffusing plates of LCD or LED.

The present invention further provide a modifier for improving haze and light transmittance, comprising crosslinked copolymer microspheres as described above, and optionally further comprising silicone resin microspheres as described above.

EMBODIMENTS

The present invention is further illustrated by means of examples below. However, the scope of the present invention is not limited by these examples.

The experimental data in the examples are determined by the following instrument and equipment and measurement method:
(1) The instrument for determining the experimental data: WGT-S transmittance and haze instrument.
(2) The method for determining the experimental data: Chinese standard GB/T 2410-2008.

EXAMPLE 1

A polycarbonate resin (Bayer, Germany, brand 2405) was placed in a blast oven and dried at 120° C. for 4 hours, and then was mixed homogenously with silicone resin microspheres (Momentive, brand TOSPEARL3120, particle size of 12 microns), crosslinked copolymer microspheres (made according to the process as disclosed in Chinese patent CN100579995C, particle size of 0.1 microns, dispersion coefficient of the particle size of 1.0002; in the copolymer, the styrene content (molar ratio) being 40%, the maleimide content (molar ratio) being 40%, and the crosslinking agent, divinylbenzene, being in an amount (molar ratio) of 20%) and antioxidant 1010, wherein, based on 100 parts by weight of the polycarbonate resin, 0.05 parts by weight of the silicone resin microspheres, 5 parts by weight of the crosslinked copolymer microspheres, and 0.1 parts by weight of the antioxidant were used. Blending was carried out in a twin screw extruder, where the feed zone temperature was 200 to 240° C., the mixing zone temperature was 240 to 280° C., and the die temperature was 200 to 240° C. After extrusion pelletization, the pellets were injection molded into standard sample piece for the test. The test results are shown in Table 1.

COMPARATIVE EXAMPLE 1

A polycarbonate resin (Bayer, Germany, brand 2405) was placed in a blast oven and dried at 120° C. for 4 hours, and then was mixed homogenously with antioxidant 1010, wherein, based on 100 parts by weight of the polycarbonate resin, 0.1 parts by weight of the antioxidant was used. Blending was carried out in a twin screw extruder, where the feed zone temperature was 200 to 240° C., the mixing zone temperature was 240 to 280° C., and the die temperature was 200 to 240° C. After extrusion pelletization, the pellets were injection molded into standard sample piece for the test. The test results are shown in Table 1.

COMPARATIVE EXAMPLE 2

A polycarbonate resin (Bayer, Germany, brand 2405) was placed in a blast oven and dried at 120° C. for 4 hours, and then was mixed homogenously with silicone resin microspheres (Momentive, brand TOSPEARL3120, particle size of 12 microns) and antioxidant 1010, wherein, based on 100 parts by weight of the polycarbonate resin, 0.05 parts by weight of the silicone resin microspheres and 0.1 parts by weight of the antioxidant were used. Blending was carried out in a twin screw extruder, where the feed zone temperature was 200 to 240° C., the mixing zone temperature was 240 to 280° C., and the die temperature was 200 to 240° C. After extrusion pelletization, the pellets were injection molded into standard sample piece for the test. The test results are shown in Table 1

EXAMPLE 1-b

A polycarbonate resin (Bayer, Germany, brand 2405) was placed in a blast oven and dried at 120° C. for 4 hours, and then was mixed homogenously with crosslinked copolymer microspheres (made according to the process as disclosed in Chinese patent CN100579995C, particle size of 0.1 microns, dispersion coefficient of the particle size of 1.0002; in the copolymer, the styrene content (molar ratio) being 40%, the maleimide content (molar ratio) being 40%, and the crosslinking agent, divinylbenzene, being in an amount (molar ratio) of 20%) and antioxidant 1010, wherein, based on 100 parts by weight of the polycarbonate resin, 5 parts by weight of the crosslinked copolymer microspheres, and 0.1 parts by weight of the antioxidant were used. Blending was carried out in a twin screw extruder, where the feed zone temperature was 200 to 240° C., the mixing zone temperature was 240 to 280° C., and the die temperature was 200 to 240° C. After extrusion pelletization, the pellets were injection molded into standard sample piece for the test. The test results are shown in Table 1.

EXAMPLE 2

A polycarbonate resin (Bayer, Germany, brand ET3113) was dried in a blast oven at 120° C. for 4 hours, and then was mixed homogenously with silicone resin microspheres (Dow Corning Corporation, brand 30-424, particle size of 2 microns), crosslinked copolymer microspheres (made according to the process as disclosed in Chinese patent CN100579995C, particle size of 0.3 microns, dispersion coefficient of the particle size of 1.017; in the copolymer, styrene content (molar ratio) being 65%, maleimide content (molar ratio) being 33.5%, and crosslinking agent being EGDMA in an amount (molar ratio) of 1.5%), and antioxidant 168, wherein, based on 100 parts by weight of the polycarbonate resin, 0.1 parts by weight of the silicone resin microspheres, 3 parts by weight of the crosslinked copolymer microspheres, and 0.1 parts by weight of the antioxidant were used. Blending was carried out in a twin screw extruder, where the feed zone temperature was 200 to 240° C., the mixing zone temperature was 240 to 280° C., and the die temperature was 200 to 240° C. After extrusion pelletization, the pellets were injection molded into standard sample piece for the test. The test results are shown in Table 1.

COMPARATIVE EXAMPLE 4

A polycarbonate resin (Bayer, Germany, brand ET3113) was placed in a blast oven and dried at 120° C. for 4 hours, and then was mixed homogenously with antioxidant 168, wherein, based on 100 parts by weight of polycarbonate resin, 0.1 parts by weight of the antioxidant was used. Blending was carried out in a twin screw extruder, wherein the feed zone temperature was 200 to 240° C., the mixing zone temperature was 240 to 280° C., and the die temperature was 200 to 240° C. After extrusion pelletization, the pellets were injection molded into standard sample piece for the test. The test results are shown in Table 1.

COMPARATIVE EXAMPLE 5

A polycarbonate resin (Bayer, Germany, brand ET3113) was placed in a blast oven and dried at 120° C. for 4 hours, and then was mixed homogenously with silicone resin microspheres (Dow Corning Corporation, brand 30-424, particle size of 2 microns), and antioxidant 168, wherein, based on 100 parts by weight of the polycarbonate resin, 0.1 parts by weight of the silicone resin microspheres, and 0.1 parts by weight of the antioxidant were used. Blending was carried out in a twin screw extruder, wherein the feed zone temperature was 200 to 240° C., the mixing zone temperature was 240 to 280° C., and the die temperature was 200 to 240° C. After extrusion pelletization, the pellets were injection molded into standard sample piece for the test. The test results are shown in Table 1.

EXAMPLE 2-b

A polycarbonate resin (Bayer, Germany, brand ET3113) was placed in a blast oven and dried at 120° C. for 4 hours, and then was mixed homogenously with crosslinked copolymer microspheres (made according to the process as disclosed in Chinese patent CN100579995C, particle size of 0.3 microns, dispersion coefficient of the particle size of 1.017; in the copolymer, styrene content (molar ratio) being 65%, maleimide content (molar ratio) being 33.5%, and the crosslinking agent being EGDMA in an amount (molar ratio) of 1.5%), and antioxidant 168, wherein, based on 100 parts by weight of the polycarbonate resin, 3 parts by weight of the crosslinked copolymer microspheres, and 0.1 parts by weight of the antioxidant were used. Blending was carried out in a twin screw extruder, where the feed zone temperature was 200 to 240° C., the mixing zone temperature was 240 to 280° C., and the die temperature was 200 to 240° C. After extrusion pelletization, the pellets were injection molded into standard sample piece for the test. The test results are shown in Table 1.

EXAMPLE 3

A polycarbonate resin (Bayer, Germany, brand 3103) was placed in a blast oven and dried at 120° C. for 6 hours, and then was mixed homogenously with silicone resin microspheres (Dow Corning Corporation, brand 30-424, particle size of 2 microns), crosslinked copolymer microspheres (made according to the process as disclosed in Chinese patent CN100579995C, particle size of 0.8 microns, dispersion coefficient of the particle size of 1.039; in the copolymer, α-methyl styrene content (molar ratio) being 45%, maleic anhydride content (molar ratio) being 45%, and the crosslinking agent being EGDMA in an amount (molar ratio) 10%), and antioxidant B225, wherein, based on 100 parts by weight of the polycarbonate resin, 0.3 parts by weight of the silicone resin microspheres, 1.5 parts by weight of the crosslinked copolymer microspheres, and 0.1 parts by weight of the antioxidant were used. Blending was carried out in a twin screw extruder, where the feed zone temperature was 200 to 240° C., the mixing zone temperature was 240 to 280° C., and the die temperature was 200 to 240° C. After extrusion pelletization, the pellets were injection molded into standard sample piece for the test. The test results are shown in Table 1.

COMPARATIVE EXAMPLE 7

A polycarbonate resin (Bayer, Germany, brand 3103) was placed in a blast oven and dried at 120° C. for 6 hours, and then was mixed homogenously with antioxidant B225, wherein, based on 100 parts by weight of the polycarbonate resin, 0.1 parts by weight of the antioxidant was used. Blending was carried out in a twin screw extruder, where the feed zone temperature was 200 to 240° C., the mixing zone temperature was 240 to 280° C., and the die temperature was 200 to 240° C. After extrusion pelletization, the pellets were injection molded into standard sample piece for the test. The test results are shown in Table 1.

COMPARATIVE EXAMPLE 8

A polycarbonate resin (Bayer, Germany, brand 3103) was placed in a blast oven and dried at 120° C. for 6 hours, and then was mixed homogenously with silicone resin microspheres (Dow Corning Corporation, brand 30-424, particle size of 2 microns), and antioxidant B225, wherein, based on 100 parts by weight of the polycarbonate resin, 0.3 parts by weight of the silicone resin microspheres, and 0.1 parts by weight of the antioxidant were used. Blending was carried out in a twin screw extruder, where the feed zone temperature was 200 to 240° C., the mixing zone temperature was 240 to 280° C., and the die temperature was 200 to 240° C. After extrusion pelletization, the pellets were injection molded into standard sample piece for the test. The test results are shown in Table 1.

EXAMPLE 3-b

A polycarbonate resin (Bayer, Germany, brand 3103) was placed in a blast oven and dried at 120° C. for 6 hours, and then was mixed homogenously with crosslinked copolymer microspheres (made according to the process as disclosed in Chinese patent CN100579995C, particle size of 0.8 microns, dispersion coefficient of the particle size of 1.039; in the copolymer, α-methyl styrene content (molar ratio) being 45%, the maleic anhydride content (molar ratio) being 45%, and the crosslinking agent being EGDMA in an amount (molar ratio) 10%), and antioxidant B225, wherein, based on 100 parts by weight of the polycarbonate resin, 1.5 parts by weight of the crosslinked copolymer microspheres, and 0.1 parts by weight of the antioxidant were used. Blending was carried out in a twin screw extruder, where the feed zone temperature was 200 to 240° C., the mixing zone temperature was 240 to 280° C., and the die temperature was 200 to 240° C. After extrusion pelletization, the pellets were injection molded into standard sample piece for the test. The test results are shown in Table 1.

EXAMPLE 4

A polycarbonate resin (SABIC, brand 9945A) was placed in a blast oven and dried at 100° C. for 6 hours, and then was mixed homogenously with silicone resin microspheres (Dow Corning Corporation, brand 30-424, particle size of 2 microns), crosslinked copolymer microspheres (made according to the process as disclosed in Chinese patent CN100579995C, particle size of 1.2 microns, dispersion coefficient of the particle size of 1.047; in the copolymer, hexene content (molar ratio) being 40%, the maleimide content (molar ratio) being 40%, and the crosslinking agent being TMPTMA in an amount (molar ratio) 20%), and antioxidant B225, wherein, based on 100 parts by weight of the polycarbonate resin, 0.4 parts by weight of the silicone resin microspheres, 1 parts by weight of the crosslinked copolymer microspheres, and 0.1 parts by weight of the antioxidant were used. Blending was carried out in a twin screw extruder, where the feed zone temperature was 200 to 240° C., the mixing zone temperature was 240 to 280° C., and the die temperature was 200 to 240° C. After extrusion pelletization, the pellets were injection molded into standard sample piece for the test. The test results are shown in Table 1.

COMPARATIVE EXAMPLE 10

A polycarbonate resin (SABIC, brand 9945A) was placed in a blast oven and dried at 120° C. for 6 hours, and then was mixed homogenously with antioxidant B225, wherein, based on 100 parts by weight of the polycarbonate resin, 0.1 parts by weight of the antioxidant was used. Blending was carried out in a twin screw extruder, where the feed zone temperature was 200 to 240° C., the mixing zone temperature was 240 to 280° C., and the die temperature was 200 to 240° C. After extrusion pelletization, the pellets were injection molded into standard sample piece for the test. The test results are shown in Table 1.

COMPARATIVE EXAMPLE 11

A polycarbonate resin (SABIC, brand 9945A) was placed in a blast oven and dried at 100° C. for 6 hours, and then was mixed homogenously with silicone resin microspheres (Dow Corning Corporation, brand 30-424, particle size of 2 microns), and antioxidant B225, wherein, based on 100 parts by weight of the polycarbonate resin, 0.4 parts by weight of the silicone resin microspheres, and 0.1 parts by weight of the antioxidant were used. Blending was carried out in a twin screw extruder, where the feed zone temperature was 200 to 240° C., the mixing zone temperature was 240 to 280° C., and the die temperature was 200 to 240° C. After extrusion pelletization, the pellets were injection molded into standard sample piece for the test. The test results are shown in Table 1.

EXAMPLE 4-b

A polycarbonate resin (SABIC, brand 9945A) was placed in a blast oven and dried at 120° C. for 6 hours, and then was mixed homogenously with cross-linked copolymer microspheres (made according to the process as disclosed in Chinese patent CN100579995C, particle size of 1.2 microns, dispersion coefficient of the particle size of 1.047; in the copolymer, hexene content (molar ratio) being 40%, the maleimide content (molar ratio) being 40%, and the crosslinking agent being TMPTMA in an amount (molar ratio) 20%), and antioxidant B225, wherein, based on 100 parts by weight of the polycarbonate resin, 1 parts by weight of the crosslinked copolymer microspheres, and 0.1 parts by weight of the antioxidant were used. Blending was carried out in a twin screw extruder, where the feed zone temperature was 200 to 240° C., the mixing zone temperature was 240 to 280° C., and the die temperature was 200 to 240° C. After extrusion pelletization, the pellets were injection molded into standard sample piece for the test. The test results are shown in Table 1.

EXAMPLE 5

A polycarbonate resin (Formosa Idemitsu, brand IR2200) was placed in a blast oven and dried at 120° C. for 4 hours, and then was mixed homogenously with silicone resin microspheres (Shin-Etsu, brand KPM590, particle size of 2 microns), crosslinked copolymer microspheres (made according to the process as disclosed in Chinese patent CN101781387B, particle size of 2 microns, dispersion coefficient of the particle size of 1.003; in the copolymer, the isoprene content (molar ratio) being 55%, the maleimide content (molar ratio) being 40%, and the crosslinking agent being EGDMA in an amount (molar ratio) of 5%), and antioxidant 1076, wherein, based on 100 parts by weight of the polycarbonate resin, 0.5 parts by weight the silicone resin microspheres, 1 parts by weight of the crosslinked copolymer microspheres, and 0.1 parts by weight of the antioxidant were used. Blending was carried out in a twin screw extruder, where the feed zone temperature was 200 to 240° C., the mixing zone temperature was 240 to 280° C., and the die temperature was 200 to 240° C. After extrusion pelletization, the pellets were injection molded into standard sample piece for the test. The test results are shown in Table 1.

COMPARATIVE EXAMPLE 13

A polycarbonate resin (Formosa Idemitsu, brand IR2200) was placed in a blast oven and dried at 120° C. for 4 hours, and then was mixed homogenously with antioxidant 1076, wherein, based on 100 parts by weight of the polycarbonate resin, 0.1 parts by weight of the antioxidant was used. Blending was carried out in a twin screw extruder, where the feed zone temperature was 200 to 240° C., the mixing zone temperature was 240 to 280° C., and the die temperature was 200 to 240° C. After extrusion pelletization, the pellets were injection molded into standard sample piece for the test. The test results are shown in Table 1.

COMPARATIVE EXAMPLE 14

A polycarbonate resin (Formosa Idemitsu, brand IR2200) was placed in a blast oven and dried at 120° C. for 4 hours, and then was mixed homogenously with silicone resin microspheres (Shin-Etsu, brand KPM590, particle size of 2 microns), and antioxidant 1076, wherein, based on 100 parts by weight of the polycarbonate resin, 0.5 parts by weight of the silicone resin microspheres, and 0.1 parts by weight of the antioxidant were used. Blending was carried out in a twin screw extruder, where the feed zone temperature was 200 to 240° C., the mixing zone temperature was 240 to 280° C., and the die temperature was 200 to 240° C. After extrusion pelletization, the pellets were injection molded into standard sample piece for the test. The test results are shown in Table 1.

EXAMPLE 5-b

A polycarbonate resin (Formosa Idemitsu, brand IR2200) was placed in a blast oven and dried at 120° C. for 4 hours, and then was mixed homogenously with crosslinked copolymer microspheres (made according to the process as disclosed in Chinese patent CN101781387B, particle size of 2 microns, dispersion coefficient of the particle size of 1.003; in the copolymer, the isoprene content (molar ratio) being 55%, the maleimide content (molar ratio) being 40%, and the crosslinking agent being EGDMA in an amount (molar ratio) of 5%), and antioxidant 1076, wherein, based on 100 parts by weight of the polycarbonate resin, 1 parts by weight of the crosslinked copolymer microspheres, and 0.1 parts by weight of the antioxidant were used. Blending was carried out in a twin screw extruder, where the feed zone temperature was 200 to 240° C., the mixing zone temperature was 240 to 280° C., and the die temperature was 200 to 240° C. After extrusion pelletization, the pellets were injection molded into standard sample piece for the test. The test results are shown in Table 1.

EXAMPLE 6

A polycarbonate resin (Dow, brand 201-22) was placed in a blast oven and dried at 120° C. for 4 hours, and then was mixed homogenously with silicone resin microspheres (Momentive, brand TOSPEARL145, particle size of 4.5 microns), crosslinked copolymer microspheres (made according to the process as disclosed in Chinese patent CN101781387B, particle size of 4 microns, dispersion coefficient of the particle size of 1.009; in the copolymer, butadiene content (molar ratio) being 70%, and the maleic anhydride content (molar ratio) being 30%), and antioxidant B225, wherein, based on 100 parts by weight of polycarbonate resin, 5 parts by weight of the silicone resin microspheres, 0.5 parts by weight of the crosslinked copolymer microspheres, and 0.1 parts by weight of the antioxidant were used. Blending was carried out in a twin screw extruder, where the feed zone temperature was 200 to 240° C., the mixing zone temperature was 240 to 280° C., and the die temperature was 200 to 240° C. After extrusion pelletization, the pellets were injection molded into standard sample piece for the test. The test results are shown in Table 1.

COMPARATIVE EXAMPLE 16

A polycarbonate resin (Dow, brand 201-22) was placed in a blast oven and dried at 120° C. for 4 hours, and then was mixed homogenously with antioxidant B225, wherein, based on 100 parts by weight of the polycarbonate resin, 0.1 parts by weight of the antioxidant was used. Blending was carried out in a twin screw extruder, where the feed zone temperature was 200 to 240° C., the mixing zone temperature was 240 to 280° C., and the die temperature was 200 to 240° C. After extrusion pelletization, the pellets were injection molded into standard sample piece for the test. The test results are shown in Table 1.

COMPARATIVE EXAMPLE 17

A polycarbonate resin (Dow, brand 201-22) was placed in a blast oven and dried at 120° C. for 4 hours, and then was mixed homogenously with silicone resin microspheres (Momentive, brand TOSPEARL145, particle size of 4.5 microns), and antioxidant B225, wherein, based on 100 parts by weight of the polycarbonate resin, 5 parts by weight of the silicone resin microspheres, and 0.1 parts by weight of the antioxidant were used. Blending was carried out in a twin screw extruder, where the feed zone temperature was 200 to 240° C., the mixing zone temperature was 240 to 280° C., and the die temperature was 200 to 240° C. After extrusion pelletization, the pellets were injection molded into standard sample piece for the test. The test results are shown in Table 1.

EXAMPLE 6-b

A polycarbonate resin (Dow, brand 201-22) was placed in a blast oven and dried at 120° C. for 4 hours, and then was mixed homogenously with crosslinked copolymer microspheres (made according to the process as disclosed in Chinese patent CN101781387B, particle size of 4 microns, dispersion coefficient of the particle size of 1.009; in the copolymer, butadiene content (molar ratio) being 70%, and the maleic anhydride content (molar ratio) being 30%), and antioxidant B225, wherein, based on 100 parts by weight of the polycarbonate resin, 0.5 parts by weight of the crosslinked copolymer microspheres, and 0.1 parts by weight of the antioxidant were used. Blending was carried out in a twin screw extruder, where the feed zone temperature was 200 to 240° C., the mixing zone temperature was 240 to 280° C., and the die temperature was 200 to 240° C. After extrusion pelletization, the pellets were injection molded into standard sample piece for the test. The test results are shown in Table 1.

EXAMPLE 7

A polycarbonate resin (Idemitsu, Japan, brand LC1500) was placed in a blast oven and dried at 120° C. for 4 hours, and then was mixed homogenously with silicone resin microspheres (Momentive, brand TOSPEARL105, particle size of 0.5 microns), crosslinked copolymer microspheres (made according to the process as disclosed in Chinese patent CN100579995C, particle size of 8 microns, dispersion coefficient of the particle size of 1.015; in the copolymer, butene content (molar ratio) being 35%, phenylmaleimide content (molar ratio) being 35%, and crosslinking agent TMPTMA being in an amount (molar ratio) of 30%), and antioxidant 126, wherein, based on 100 parts by weight of the polycarbonate resin, 10 parts by weight the silicone resin microspheres, 0.1 parts by weight of the crosslinked copolymer microspheres, and 0.1 parts by weight of the antioxidant were used. Blending was carried out in a twin screw extruder, where the feed zone temperature was 200 to 240° C., the mixing zone temperature was 240 to 280° C., and the die temperature was 200 to 240° C. After extrusion pelletization, the pellets were injection molded into standard sample piece for the test. The test results are shown in Table 1.

COMPARATIVE EXAMPLE 19

A polycarbonate resin (Idemitsu, Japan, brand LC1500) was placed in a blast oven and dried at 120° C. for 4 hours, and then was mixed homogenously with antioxidant 126, wherein, based on 100 parts by weight of the polycarbonate resin, 0.1 parts by weight of the antioxidant was used. Blending was carried out in a twin screw extruder, where the feed zone temperature was 200 to 240° C., the mixing zone temperature was 240 to 280° C., and the die temperature was 200 to 240° C. After extrusion pelletization, the pellets were injection molded into standard sample piece for the test. The test results are shown in Table 1.

COMPARATIVE EXAMPLE 20

A polycarbonate resin (Idemitsu, Japan, brand LC1500) was placed in a blast oven and dried at 120° C. for 4 hours, and then was mixed homogenously with silicone resin microspheres (Momentive, brand TOSPEARL105, particle size of 0.5 microns), and antioxidant 126, wherein, based on 100 parts by weight of the polycarbonate resin, 10 parts by weight of the silicone resin microspheres, and 0.1 parts by weight of the antioxidant were used. Blending was carried out in a twin screw extruder, where the feed zone temperature was 200 to 240° C., the mixing zone temperature was 240 to 280° C., and the die temperature was 200 to 240° C. weight of the crosslinked copolymer microspheres, and 0.1 parts by weight of the antioxidant were used. Blending was carried out in a twin screw extruder, where the feed zone temperature was 200 to 240° C., the mixing zone temperature was 240 to 280° C., and the die temperature was 200 to 240° C. After extrusion pelletization, the pellets were injection molded into standard sample piece for the test. The test results are shown in Table 1.

TABLE 1

| | Component a | Component c | Component b | Light transmittance, % | Haze, % |
|---|---|---|---|---|---|
| Ex. 1 | 100 | 0.05 | 5 | 59.3 | 96.5 |
| Comp. Ex. 1 | 100 | 0 | 0 | 88.1 | 3.7 |
| Comp. Ex. 2 | 100 | 0.05 | 0 | 48.9 | 96.5 |
| Ex. 1-b | 100 | 0 | 5 | 89.6 | 12.2 |
| Ex. 2 | 100 | 0.1 | 3 | 63.8 | 95.9 |
| Comp. Ex. 4 | 100 | 0 | 0 | 88.3 | 2.1 |
| Comp. Ex. 5 | 100 | 0.1 | 0 | 74.3 | 86.7 |
| Ex. 2-b | 100 | 0 | 3 | 88.5 | 57.5 |
| Ex. 3 | 100 | 0.3 | 1.5 | 60.1 | 96.1 |
| Comp. Ex. 7 | 100 | 0 | 0 | 88.4 | 2.6 |
| Comp. Ex. 8 | 100 | 0.3 | 0 | 53.0 | 93.9 |
| Ex. 3-b | 100 | 0 | 1.5 | 90.5 | 19.4 |
| Ex. 4 | 100 | 0.4 | 1 | 60.4 | 96.0 |
| Comp. Ex. 10 | 100 | 0 | 0 | 87.6 | 1.9 |
| Comp. Ex. 11 | 100 | 0.4 | 0 | 51.7 | 95.8 |
| Ex. 4-b | 100 | 0 | 1 | 91.6 | 18.6 |
| Ex. 5 | 100 | 0.5 | 1 | 59.6 | 96.0 |
| Comp. Ex. 13 | 100 | 0 | 0 | 88.3 | 3.2 |
| Comp. Ex. 14 | 100 | 0.5 | 0 | 49.4 | 94.7 |
| Ex. 5-b | 100 | 0 | 1 | 90.8 | 19.5 |
| Ex. 6 | 100 | 5 | 0.5 | 59.5 | 96.3 |
| Comp. Ex. 16 | 100 | 0 | 0 | 88.5 | 2.0 |
| Comp. Ex. 17 | 100 | 5 | 0 | 43.3 | 95.0 |
| Ex. 6-b | 100 | 0 | 0.5 | 89.3 | 13.7 |
| Ex. 7 | 100 | 10 | 0.1 | 59.2 | 96.3 |
| Comp. Ex. 19 | 100 | 0 | 0 | 89.0 | 1.6 |
| Comp. Ex. 20 | 100 | 10 | 0 | 45.1 | 96.7 |
| Ex. 7-b | 100 | 0 | 0.1 | 89.3 | 9.7 |

After extrusion pelletization, the pellets were injection molded into standard sample piece for the test. The test results are shown in Table 1.

EXAMPLE 7-b

A polycarbonate resin (Idemitsu, Japan, brand LC1500) was placed in a blast oven and dried at 120° C. for 4 hours, and then was mixed homogenously with crosslinked copolymer microspheres (made according to the process as disclosed in Chinese patent CN100579995C, particle size of 8 microns, dispersion coefficient of the particle size of 1.015; in the copolymer, butene content (molar ratio) being 35%, phenylmaleimide content (molar ratio) being 35%, and the crosslinking agent TMPTMA being in an amount (molar ratio) of 30%), and antioxidant 126, wherein, based on 100 parts by weight of the polycarbonate resin, 0.1 parts by As can be seen from the data in Table 1, compared with the sample piece prepared from the resin composition without adding of any microspheres, only adding silicone resin microspheres could evidently increase the haze, but the light transmittance was largely reduced; only adding crosslinked copolymer microspheres as described according to the present invention could increase both the light transmittance and the haze to some extent; when adding the two kinds of microspheres, the haze was evidently increased and the light transmittance was reduced, but not evidently, the sample piece could achieve a haze of not less than 95%, and at the same time a light transmittance of not less than 59%. Correspondingly, the polycarbonate sample having the two kinds of microspheres blended therein of the present invention has higher haze, and the same time has high light transmittance. The resin composition of the present invention can save a lot of energy while achieving excellent light diffusing effect, and at the same time can reduce the material cost and can be easily industrially produced.

What is claimed:

1. Resin composition having improved haze and light transmittance, comprising the following blended components: a. matrix resin; and b. optionally crosslinked copolymer microspheres; wherein the optionally crosslinked copolymer microspheres are alternating copolymers formed from monomers having anhydride, amide and/or imide groups, with olefin monomers and/or furan and its derivatives, and optionally crosslinked with a crosslinking agent.

2. The resin composition according to claim 1, characterized in that the optionally crosslinked copolymer microspheres are monodisperse copolymer microspheres.

3. The resin composition according to claim 1, characterized in that the optionally crosslinked copolymer microspheres have a particle size of from 0.01 to 20 microns, and dispersion coefficient of the particle size of 1.05 to 1.0001.

4. The resin composition according to claim 3, characterized in that the optionally crosslinked copolymer microspheres have a particle size of from 0.1 to 10 microns.

5. The resin composition according to claim 3, characterized in that the optionally crosslinked copolymer microspheres have a particle size of from 0.3 to 5 microns.

6. The resin composition according to claim 3, characterized in that the optionally crosslinked copolymer microspheres have dispersion coefficient of the particle size of 1.02 to 1.001.

7. The resin composition according to claim 3, characterized in that the optionally crosslinked copolymer microspheres have dispersion coefficient of the particle size of 1.017 to 1.001.

8. The resin composition according to claim 1, characterized in that the optionally crosslinked copolymer microspheres are prepared by a self-stabilized dispersion polymerization process.

9. The resin composition according to claim 1, characterized in that the content of the optionally crosslinked copolymer microspheres as component b is 0.01 to 10 parts, based on 100 parts by weight of the matrix resin as component a.

10. The resin composition according to claim 9, characterized in that the content of the optionally crosslinked copolymer microspheres as component b is 0.05 to 8 parts, based on 100 parts by weight of the matrix resin as component a.

11. The resin composition according to claim 9, characterized in that the content of the optionally crosslinked copolymer microspheres as component b is 0.1 to 5 parts, based on 100 parts by weight of the matrix resin as component a.

12. The resin composition according to claim 1, characterized in that the matrix resin as component a is selected from at least one transparent or translucent matrix resin.

13. The resin composition according to claim 12, characterized in that the matrix resin as component a is an aromatic polycarbonate resin.

14. The resin composition according to claim 13, characterized in that the polycarbonate resin is copolycarbonate formed from dihydric phenol and/or phenol-modified diol.

15. The resin composition according to claim 14, characterized in that the dihydric phenol is the compound of following formula (I):

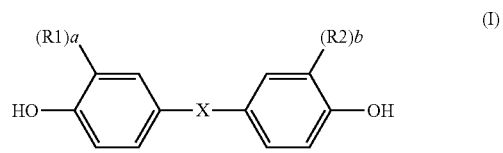

in which
R1 and R2 each independently represent an alkyl group having 1-6 carbon atoms which is linear, branched or cyclic;
a and b respectively represent the number of substituents R1 and R2, and are an integer of 0 to 4; when R1 is two or more, the multiple R1s are the same or different from each other, when R2 is two or more, the multiple R2s are the same or different from each other;
X is a single bond, an alkylene having 1 to 8 carbon atoms, an alkylidene group having 2 to 8 carbon atoms, a cycloalkylene having 5 to 15 carbon atoms, a cycloalkylidene having 5 to 15 carbon atoms, —S—, —SO—, —O—, —CO— or the structure shown by the following formula (II-a) or formula (II-b):

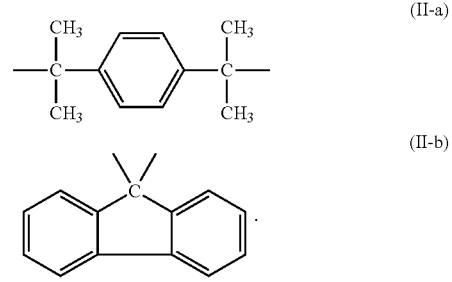

16. The resin composition according to claim 14, characterized in that the phenol-modified diol is a compound represented by the following formula (III):

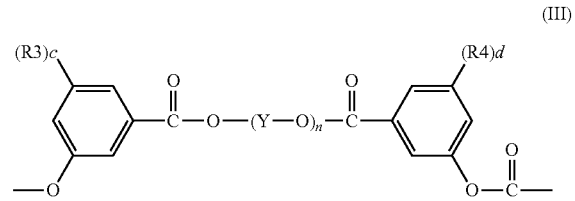

in which
R3 and R4 each independently represent an alkyl group having 1 to 3 carbon atoms,
Y represents a linear or branched alkylene having 2 to 15 carbon atoms,
c and d each represent the number of substituents R3 and R4, and are an integer from 0 to 4,
n is an integer of 2 to 200 when R3 is two or more, the multiple R3s are the same or different from each other; when R4 is two or more, the multiple R4s are the same or different from each other.

17. The resin composition according to claim 16, characterized in that the phenol-modified diol is a compound derived from hydroxybenzoic acid or its alkyl ester, acyl chloride and polyether-type diol.

18. The resin composition according to claim 17, characterized in that the alkyl ester of hydroxybenzoic acid is selected from methyl hydroxybenzoate, and ethyl hydroxybenzoate.

19. The resin composition according to claim 17, characterized in that the acyl chloride is selected from a compound obtained by reacting hydroxybenzoic acid with phosgene.

20. The resin composition according to claim 17, characterized in that the polyether-type diol is a compound having the formula HO—(Y—O)$_n$—H, wherein Y and n are defined as those in formula (III).

21. The resin composition according to claim 17, characterized in that the polyether-type diol is at least one selected from polyethylene glycol, polypropylene glycol, and polybutylene glycol.

22. The resin composition according to claim 16, characterized in that in formula III, n is an integer of 6 to 70.

23. The resin composition according to claim 14, characterized in that the dihydric phenol is at least one selected from compounds of bis(hydroxy aryl)alkanes, bis(hydroxyl aryl)cycloalkanes, dihydroxy aromatic ethers, dihydroxydiaryl sulfides, dihydroxy diaryl sulfoxides, dihydroxydiarylsulfones, dihydroxybiphenyls, dihydroxydiphenyl fluorenes, dihydroxydiaryl adamantanes, bis(4-hydroxyphenyl)diphenylmethane, 4,4'-[1,3-phenylene bis(1-methylethylidene)] bisphenol, 10,10-bis(4-hydroxyphenyl)-9-anthrone, α,ω-bishydroxyphenyl polydimethylsiloxane.

24. The resin composition according to claim 23, characterized in that the bis(hydroxy aryl) alkanes are selected from at least one of 2,2-bis(4-hydroxyphenyl) propane, bis(4 hydroxy phenyl) methane, 1,1-bis(4-hydroxyphenyl)ethane, 2,2-bis(4-hydroxyphenyl)propane, 2,2-bis(4-hydroxyphenyl)butane, 2,2-bis(4-hydroxyphenyl) octane, 2,2-bis(4-hydroxy-1-methylphenyl)propane, bis(4-hydroxyphenyl)naphthylmethane, 1,1-bis(4-hydroxy-tert-butylphenyl)propane, 2,2-bis(4-hydroxy-3-bromophenyl)propane, 2,2-bis(4-hydroxy-3,5-dimethylphenyl)propane, 2,2-bis(4-hydroxy-3-chlorophenyl)propane, 2,2-bis(4-hydroxy-3,5-dichlorophenyl)propane, and 2,2-bis(4-hydroxy-3,5-dibromophenyl) propane;
the bis(hydroxyl aryl) cycloalkanes are selected from at least one of 1,1-bis(4-hydroxyphenyl)cyclopentane, 1,1-bis(4-hydroxyphenyl)cyclohexane, and 1,1-bis(4-hydroxyphenyl)-3,5,5-trimethyl cyclohexane;
the dihydroxy aromatic ethers are selected from at least one of 4,4'-dihydroxyphenyl ether, and 4,4'-dihydroxy-3,3-dimethylphenyl ether;
the dihydroxydiaryl sulfides are selected from at least one of 4,4'-dihydroxy diphenyl sulfide, and 4,4'-dihydroxy-3,3'-dimethyldiphenyl sulfide;
the dihydroxydiaryl sulfoxides are selected from at least one of 4,4'-dihydroxydiphenyl sulfoxide, and 4,4'-dihydroxy-3,3'-dimethyl diphenyl sulfoxide;
the dihydroxydiaryl sulfones are selected from at least one of 4,4'- dihydroxydiphenyl sulfone, and 4,4'-dihydroxy-3,3'-dimethyl diphenyl sulfone;
the dihydroxydiphenyl fluorenes are selected from at least one of 9,9-bis(4-hydroxyphenyl) fluorene, and 9,9-bis (4-hydroxy-3-methylphenyl) fluorene; and
the dihydroxydiaryl adamantanes are selected from at least one of 1,3-bis(4-hydroxyphenyl) adamantane, 2,2-bis(4-hydroxyphenyl) adamantane, and 1,3-bis(4-hydroxyphenyl)-5,7-dimethyl adamantane.

25. The resin composition according to claim 12, characterized in that the matrix resin as component a is selected from at least one of polycarbonate resins, acrylic resins, polyester resins, cyclic olefin polymer resins, polystyrene resins, poly(ethylene-co-1,4-cyclohexylenedimethylene terephthalate) (PETG), acrylonitrile-butadiene-styrene copolymer (ABS), acrylonitrile-styrene resin (AS), methyl-methacrylate-butadiene-styrene copolymer (MBS), polypropylene, polyethylene, nylon, ethylene-vinyl acetate copolymer (EVA), allyl diglycol carbonate (CR-39), poly-4-methyl-1-pentene (TPX), poly(hydroxyethyl methacrylate) (HEMA), polyvinyl alcohol, cellulose acetate, cellulose nitrate, ethylene-tetrafluoroethylene copolymer, polyvinyl butyral, polyether sulphone and derivatives thereof.

26. The resin composition according to claim 1, characterized in that the the monomer having anhydride, and/or imide groups is the compound having the following formula (IV):

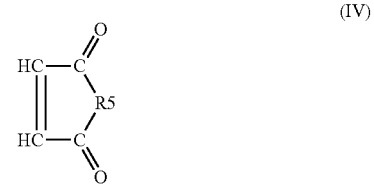

wherein R5 is oxygen atom, imino group or derivative thereof.

27. The resin composition according to claim 26, characterized in that in formula (IV), R5 is oxygen atom, imino group, phenylimino, alkylphenylimino or alkylimino having 1 to 20 carbon atoms, wherein the alkyl group is linear, branched or cyclic.

28. The resin composition according to claim 26, characterized in that in formula (IV), R5 is oxygen atom, or imino group.

29. The resin composition according to claim 26, characterized in that the monomer having anhydride, and/or imide group is selected from at least one of maleic anhydride, maleimide, bismaleimide, and phenyl maleimide.

30. The resin composition according to claim 1, characterized in that the olefin monomer is at least one of the olefin monomer containing from 2 to 30 carbon atoms.

31. The resin composition according to claim 30, characterized in that the olefin monomer is at least one of butene, butadiene, pentene, isoprene, cyclopentadiene, dicyclopentadiene, hexene, hexadiene, cyclohexene, cyclohexadiene, octene, octadiene, cyclooctadiene, styrene and derivatives thereof, and vinyl alkyl ether.

32. The resin composition according to claim 31, characterized in that butene is isobutene.

33. The resin composition according to claim 31, characterized in that butadiene is cis-butadiene.

34. The resin composition according to claim 31, characterized in that styrene and derivatives thereof are hyperbranched styrene, sulfonated styrene, or alpha-methylstyrene.

35. The resin composition according to claim 1, characterized in that the alternating copolymer further comprises a monomer having acid, ester, ether, and/or nitrile group.

36. The resin composition according to claim 35, characterized in that the monomer having acid, ester, ether, and/or nitrile group is selected from at least one of vinyl acetate, acrylonitrile and vinyl alkyl ether.

37. The resin composition according to claim 1, characterized in that in the optionally crosslinked copolymer microspheres, the content of the monomer having anhydride, amide and/or imide group is 10 to 90% by mole; the total content of other one or more monomers is 10 to 90% by mole; and the content of the crosslinking agent is 0 to 50% by mole, wherein the sum of the monomer having anhydride, amide and/or imide group, other one of more monomers and the crosslinking agent is 100% by mole.

38. The resin composition according to claim 37, characterized in that in the optionally crosslinked copolymer microspheres, the content of the monomer having anhydride, amide and/or imide group is 20 to 80% by mole; and the total content of other one or more monomers is 20 to 80% by mole.

39. The resin composition according to claim 37, characterized in that in the optionally crosslinked copolymer microspheres, the content of the monomer having anhydride, amide and/or imide group is 30 to 50% by mole; and the total content of other one or more monomers is 30 to 50% by mole.

40. The resin composition according to claim 37, characterized in that in the optionally crosslinked copolymer microspheres, the content of the crosslinking agent is 0 to 40% by mole.

41. The resin composition according to claim 37, characterized in that in the crosslinked copolymer microspheres, the content of the crosslinking agent is 0 to 30% by mole.

42. The resin composition according to claim 1, characterized in that the optionally crosslinked copolymer microspheres are crosslinked with a crosslinking agent.

43. The resin composition according to claim 42, characterized in that the crosslinking agent is selected from olefinic organic compounds with polyfunctionality.

44. The resin composition according to claim 42, characterized in that the crosslinking agent is selected from ethylene glycol dimethacrylate and trimethylolpropane trimethacrylate.

45. The resin composition according to claim 1, characterized in that the resin composition further comprises the following blended component: c. silicone resin microspheres.

46. The resin composition according to claim 45, characterized in that the content of the silicone resin microspheres as component c is 0.01 to 10 parts.

47. The resin composition according to claim 46, characterized in that the content of the silicone resin microspheres as component c is 0.05 to 8 parts, based on 100 parts by weight of the matrix resin as component a.

48. The resin composition according to claim 46, characterized in that the content of the silicone resin microspheres as component c is 0.1 to 5 parts, based on 100 parts by weight of the matrix resin as component a.

49. The resin composition according to claim 45, characterized in that the silicone resin microspheres have a particle size of from 0.1 to 100 microns.

50. The resin composition according to claim 49, characterized in that the silicone resin microspheres have a particle size of from 1 to 50 microns.

51. The resin composition according to claim 49, characterized in that the silicone resin microspheres have a particle size of from 2 to 30 microns.

52. The resin composition according to claim 45, characterized in that the silicone resin in the silicone resin microspheres is organopolysiloxane.

53. The resin composition according to claim 52, characterized in that the silicone resin contains at least one phosphonate group and/or phosphinate group and at least one nitrogen-containing organic group.

54. The resin composition according to claim 1, characterized in that the resin composition has a haze of not less than 92%.

55. A modifier for improving haze and light transmittance, comprising optionally crosslinked copolymer microspheres as defined in claim 1, and optionally further comprising silicone resin microspheres as defined in claim 45.

56. The resin composition according to claim 54, characterized in that the resin composition simultaneously has a light transmittance of not less than 55%.

57. The resin composition according to claim 56, characterized in that the resin composition simultaneously has a light transmittance of not less than 59%.

58. The resin composition according to claim 54, characterized in that the resin composition has a haze of not less than 95%.

59. A process for preparation of the resin composition according to claim 1, by one-time melt blending all the components comprising the matrix resin, and optionally crosslinked copolymer microspheres, via a rubber plastic blend equipment.

60. A material with improved haze and light transmittance prepared from the resin composition according to claim 1.

61. The material according to claim 60, characterized in that the material is a light diffusing material.

62. Illuminations; building materials; displays or projection devices comprising scratch-resistant rear projection screen or thin-layer decorative plate; or light diffusing plates of LCD or LED, comprising the material according to claim 60.

63. Illuminations devices according to claim 62, characterized in that they are lamps, luminous signs, car skylights, or automobile lampshades.

64. Building materials according to claim 62, characterized in that they are roofs or greenhouses.

65. The resin composition according to claim 12, characterized in that the matrix resin as component a is a polycarbonate resin.

66. A resin composition having improved haze and light transmittance, comprising the following blended components: a. matrix resin; b. crosslinked copolymer microspheres; wherein the crosslinked copolymer microspheres are alternating copolymers formed from monomers having anhydride, amide and/or imide groups, with olefin monomers and/or furan and its derivatives, and crosslinked with a crosslinking agent; c. silicone resin microspheres, wherein content of the silicone resin microspheres as component c is 0.01 to 10 parts based on 100 parts by weight of the matrix resin as component a.

67. The resin composition according to claim 66, wherein content of the silicone resin microspheres as component c is 0.05 to 8 parts based on 100 parts by weight of the matrix resin as component a.

* * * * *